Feb. 14, 1939.  J. E. KENNEDY  2,147,300
MEANS FOR HANDLING MATERIAL
Filed March 2, 1936  2 Sheets-Sheet 1

INVENTOR
J. E. Kennedy
BY John O. Seifert
ATTORNEY

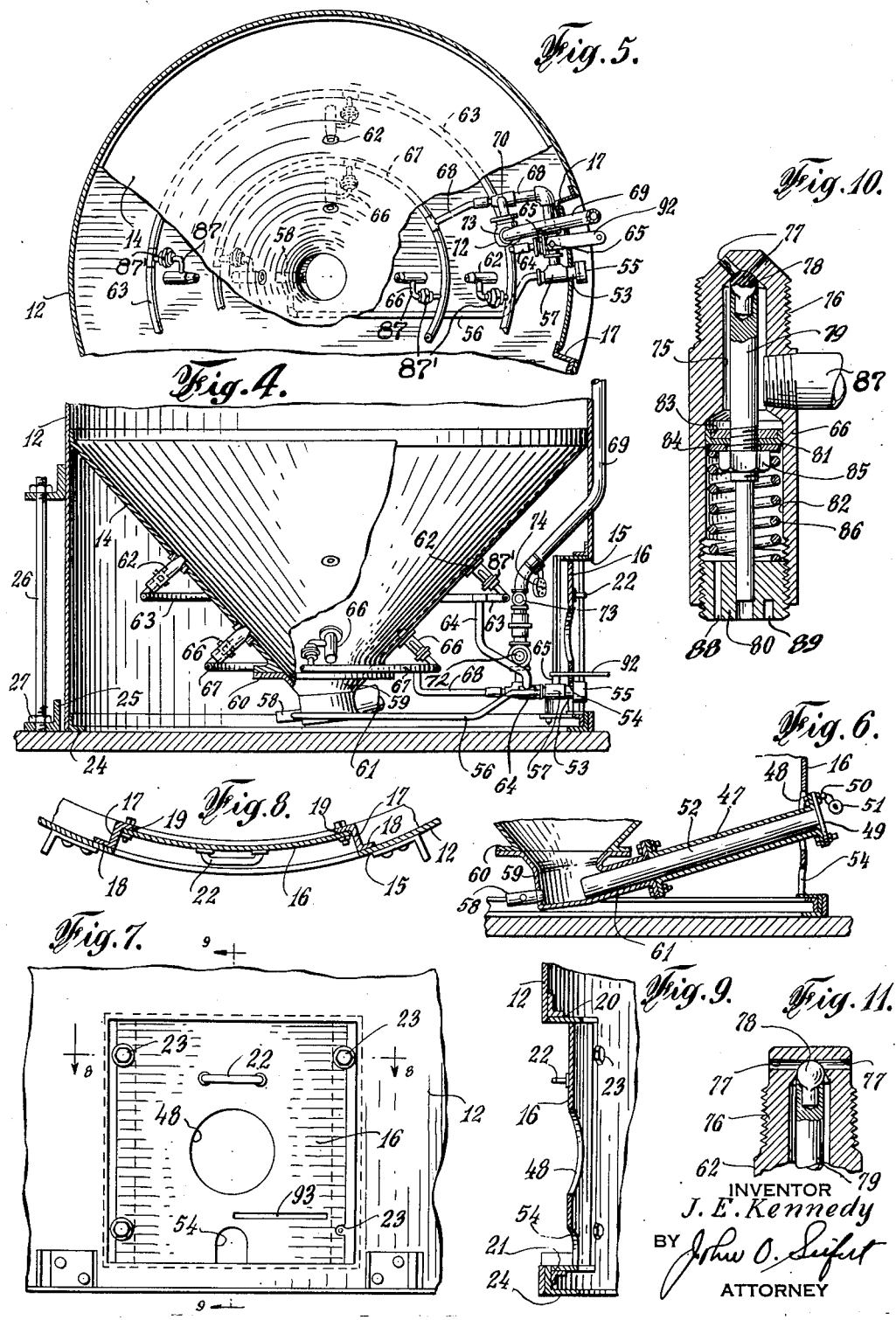

Patented Feb. 14, 1939

2,147,300

UNITED STATES PATENT OFFICE 2,147,300

MEANS FOR HANDLING MATERIAL

Joseph E. Kennedy, New York, N. Y., assignor, by mesne assignments, to Reconstruction Finance Corporation, Philadelphia, Pa., a corporation of the United States Application March 2, 1936, Serial No. 66,521

5 Claims. (Cl. 302—53)

This invention relates to the handling and transporting of materials, such as pulverized coal, flour, cement and the like material, liquid or semi-liquid materials, such as slurries, slimes and concrete, as well as granular material, such as rye, wheat, oats, corn, flaxseed and the like materials, wherein the material is filled into a container at a source of supply of the material and the container with the material filled therein transported from the source of supply to a place remote therefrom, and then discharging the material from the container by fluid pressure, such as steam or air, admitted into the container and conveying the discharged material by the discharging medium to a place of storage or use remote from the container.

It is an object of the invention to provide an improved pressure container having a filler inlet in the top and a hopper bottom having an outlet with means to seal the filling inlet, and the body of the container arranged with a base portion surrounding and extending beyond the hopper bottom to support the container on the supporting surface of a transporting vehicle and forming a bottom enclosing compartment provided with an access opening in communication with the compartment, and the provision of an air supply conduit connected in communication with the container through the top and hopper bottom having an air inlet adapted for coupling connection with a conduit leading from a source of compressed air, or connection of means to seal the inlet, and a valve adjacent the access opening to control the connection of the supply conduit with the source of air and the connection thereof with the top of the container, as disclosed in the application of myself and one Herbert W. Johnson Serial No. 613,904, filed May 23, 1932, on which application Patent No. 2,032,367 issued.

It is another object of the invention to provide in a container of this character having a base portion forming a compartment enclosing the hopper bottom of the container arranged with an access opening in communication with the compartment, a removable closure for the access opening and the air supply conduit extended through an opening in said closure into the compartment with the inlet of said conduit exterior of the compartment, and the provision of means to reduce the pressure of the air admitted into the top of the container relative to the pressure of the air admitted into the bottom of the container and means operative by the pressure of the air in the container to relieve the container of air having a pressure in excess of a predetermined pressure and lower than the pressure of the air admitted into the bottom of the container.

It is a further object of the invention to provide in a container of this character improved discharge outlet means including a conduit connected to and extending laterally from the outlet of the hopper bottom through an opening in the closure for the access opening to the compartment at an angle inclining upwardly relative to the horizontal and the outlet of said conduit arranged for coupling connection to a conveying conduit for the material discharged from the container or a closure to seal the same and prevent material entering into the conduit from the container during the filling of material into the container and transporting material in the container.

Other objects and advantages will hereinafter appear.

In the drawings accompanying and forming a part of this application

Figure 4 is a sectional view of the lower portion of the container taken substantially centrally of the container to show the mounting of nozzles in the bottom of the container for admitting fluid pressure into the container in the discharging of the material from the container and showing the connections of said nozzles with a conduit adapted for connection with a source of fluid under pressure.

Figure 5 is a view looking at the top of Figure 4 with a portion of the bottom of the container broken away.

Figure 6 is a detail view in side elevation of outlet means of the container and leading through an opening in a closure for an opening in the extended portion of the side wall of the container and showing the closure means for said outlet means.

Figure 7 is a front elevation of the lower portion of the container with the opening in the side wall and showing the closure applied thereto.

Figure 8 is a sectional view taken substantially on the line 8—8 of Figure 7 looking in the direction of the arrows.

Figure 9 is a sectional view taken substantially on the line 9—9 of Figure 7 looking in the direction of the arrows.

Figure 10 is a sectional detail view of a nozzle mounted in the bottom wall of the container; and Figure 11 is a fragmentary sectional view of the outlet end of the nozzle shown in Figure 10 showing a modified arrangement of the nozzle outlet to direct streams issuing therefrom laterally in opposite directions.

Figure 1:
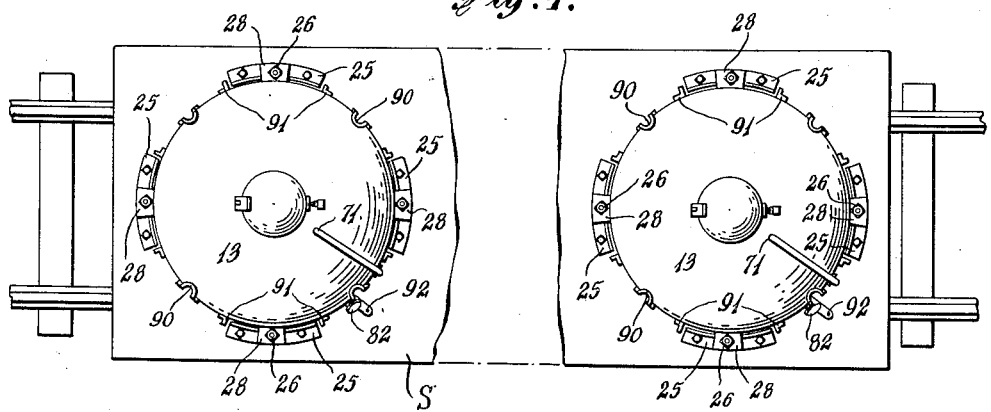
Figure 1 is a plan view and Figure 2 is a side elevation of containers embodying the invention mounted on a railway car to transport the same and showing means for mounting the containers on the car.

In the embodiment of the invention illustrated in the drawings for carrying out the invention, there is provided a container or vessel comprising a vertically disposed body 12 to constitute the side wall of the container and preferably of cylindrical form. One end of the container, to constitute the upper end thereof, is closed by a dome shaped head 13 having an opening through which to fill material into the container, and a hopper bottom 14 having a material outlet through the apex. The bottom is arranged within and secured to the body intermediate the ends thereof so that the body or side wall of the container will extend about and beyond the bottom, as clearly shown in Figure 4, and said extended side wall being adapted to constitute a base portion for supporting and mounting of the container upon a platform support, as S, and co-operate with such support to provide a housing or compartment about and enclosing the bottom therein. To gain access to the compartment or chamber about the bottom, the extended portion of the side wall is provided with an opening 15, shown as of rectangular form, and closed by a releasable closure, shown in the form of a rectangular plate 16. To releasably and removably mount said closure member in the opening, jamb members are arranged to extend longitudinally of the opposite sides of the opening, each of said jamb members comprising a plate 17 having the opposite longitudinal marginal portions flanged in opposite directions, one flange abutting and secured to the container wall, as by welding, as at 18, and the opposite flange extending toward the opening to constitute the jambs for the closure plate, as clearly shown at 19 in Figure 8. Due to the curvature of the wall of the body 12, and the securing of the jamb plates to the inner marginal portions of the opposite side walls of the opening, the closure plate is arranged within the contour of the body, the space above and below the closure member being closed by plates secured to and extended inward from the wall of the body, as shown at 20 and 21 in Figure 9. To facilitate the manipulation of the closure plate relative to the opening 15, it is provided with a U shaped hand grip 22 fixed at the opposite ends to the closure plate. The closure plate is retained in closing position by bolts engaged in openings in the jambs 19 and slots in the closure plate 16 extending inwardly from the side edges thereof with nuts engaged on the ends of the bolts projecting from the closure plate, as shown at 23 in Figures 7 and 8. To reinforce the bottom end of the body and provide the same with a supporting base, an annular member 24 of rectangular shape in cross section is secured at one angle portion to the body, as by welding, and the other angle portion extending laterally and flush with the end of the body, as shown in Figure 4. To secure the container to the support S, cleats 25 in the form of segments and of angle shape in cross section are secured at one angle portion to the support with the other angle portion engaging at the outer side of the container in opposed relation to the reinforcing member 24. The container is secured to said cleats by tie rods 26, screw threaded at one end into the cleats 25 and secured therein by lock nuts 27, the opposite ends of the tie rods being extended through openings in angle brackets 28 secured to the container, as by welding, and held therein by nuts threaded onto the ends of the tie rods.

Figure 3:
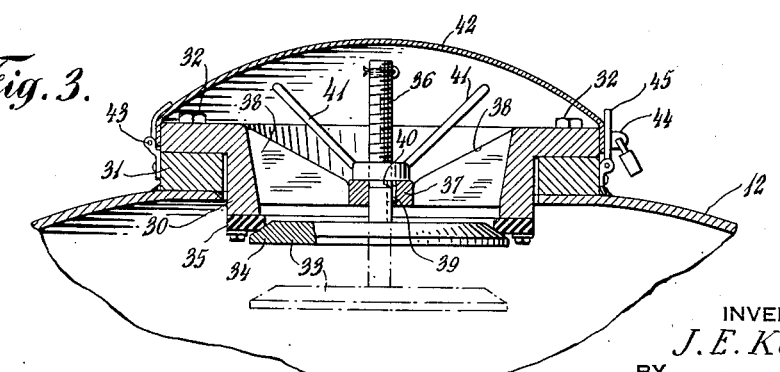
Figure 3 is a sectional view of the upper portion of the container showing the closure means for the filler opening or material inlet to the container.

The filler opening of the container (Figure 3) is provided with closure means adapted to be manually actuated to opening and closing positions and actuated independently by pressure within the container to pressure seal said opening, and shown as comprising an annular member 30 engaged in the filler opening having a laterally extending annular flange whereby it is supported from the wall about the opening with an interposed annular block 31 welded to the container head, the annular member 30 being secured to said block, as by screws 32. A closure member in the form of a disk 33 of greater diameter than the opening through the member 30 is carried by said member 30 within the container to have outward closing movement and inward opening movement. To provide a pressure tight closure, the disk has a bevelled peripheral portion 34 adapted to seat against a ring 35 of yielding and resilient material, such as rubber, disposed about the inner end of the member 30, the opening through said ring being of a diameter slightly less than the opening through the annular member 30 whereby the inner peripheral portion of said ring will extend into the opening of the annular member 30 and provide a yielding seat for the closure. The closure disk is adjustably mounted on and carried by the annular member 30 by a stem 36 secured to and extending axially from the closure disk slidably engaged in an opening in a hub 37 carried axially of the annular member 30 by spider arms 38 extended radially inward from said annular member, and said stem and closure disk being held against rotation by a key in the hub engaging a keyway in the stem, as at 39. To manually adjust the closure disk toward and away from the annular member 30 to close the opening and open the same to the container, a nut 40 is threaded onto the stem at the outer side of the hub 37, said nut being provided with hand grips 41 to facilitate the turning of the nut onto the stem and drawing of the closure disk to the seat 35. The arrangement of drawing the closure member to its seat by the nut as described will permit of movement of the closure member to its seat 35 by fluid pressure within the container independent of turning the nut 40 on the stem 36.

To protect the closure means from the elements and accumulation of foreign substances thereon exterior of the container, and also to prevent tampering with the contents of the container, a removable closure means is provided therefor, shown as comprising a dome-shaped hood 42 hingedly connected, as at 43, to the block 31, the hood being arranged diametrically opposite to its hinge support with a laterally extended perforated ear 44 to engage in an opening in a latch 45 pivotally mounted on the block 31, and the ear secured against disengagement from the latch opening by a suitable locking means, such as a padlock 46 the hasp of which is adapted to engage perforations in the ear 44.

The material is discharged from the container through outlet means, shown as a discharge conduit 47 connected in communication with the outlet in the hopper bottom 14 to extend laterally and incline upwardly relative to the horizontal and of a length to extend through an opening 48 in the closure plate 16 with the end portion exterior of the closure plate flanged laterally for the engagement of a closure member 49 retained in closing position by bolts, as at 50, during the transporting of the container. To prevent removal of the closure member 49 and the material from the container, by unauthorized persons, suitable means is provided to lock the closure member in closing position, shown as a key operated lock 51 secured to one of the bolts exteriorly of the nut thereon, as shown in Figure 6.

To prevent material packing in and clogging the container outlet and discharge conduit 47, particularly when the material in the container consists of cement which may absorb moisture, such as moisture of condensation or otherwise, and a consequent partial setting of the same, the closure member 49 is provided with a plug 52 to engage in the conduit 47 and being of a length to extend to the outlet. When it is desired to discharge the material from the container the closure member 49 with the plug 52 is removed and a suitable conduit, not shown, through which to convey the material in the container to a place of use or storage, is connected to the flanged end of the conduit 47.

The material is discharged from the outlet of the container by fluid pressure, such as steam or air, preferably air under pressure, admitted into the container from a suitable source of supply to loosen and aerate the material at the bottom of the container and into the top of the container above the material therein to exert an extruding force on the material and into the conduit 47 at the connection thereof with the outlet of the container, said fluid pressure being adapted to constitute the sole conveying vehicle for the material discharged from the container to a point remote from the container. For this purpose means connected with the container are arranged within the housing or compartment formed by the side wall of the container extended beyond the bottom 14 and adapted for connection exterior of said compartment with the source of fluid under pressure.

The means connecting the container with the source of fluid, such as air, under pressure comprises a conduit or pipe 53 extended through an opening 54 in the closure plate 16 arranged for connection with a valve controlled conduit, not shown, leading from the source of supply and adapted to be closed and sealed by a cap during the transporting of the container, as shown at 55. A branch pipe 56 is connected by a T-coupling 57 with the pipe 53, the pipe 56 leading to and being connected with a nozzle or jet 58 mounted in line with the discharge conduit 47 in and opening to a member in the form of a cap 59 connected to the outlet of the container by a laterally extending flange abutting a corresponding flange about the outlet of the container and secured thereto, as by welding, as at 60, said connecting member 59 having a laterally extending tubular neck 61 to which the outlet conduit 47 is connected. A series of nozzles 62 are mounted in and opening through the bottom wall to the container, the nozzles being spaced about the bottom in a circular row and connected to a pipe 63 encircling the bottom connected by a branch pipe 64 to the casing of a three way valve, shown in a conventional manner at 65, connected in proximity to the access opening to the compartment to the T-coupling 57 and thereby with the main conduit 53.

Figure 2:
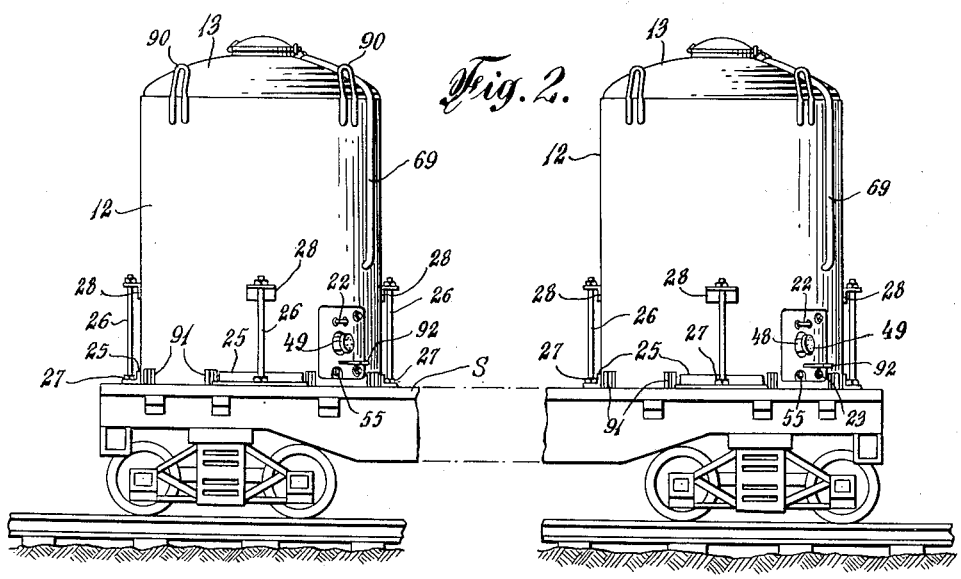

A second series of nozzles 66 are mounted in and opening through the bottom wall to the container, said nozzles also being spaced about the bottom in a circular row below the nozzles 62 and adjacent the outlet of the container, said nozzles being connected to a pipe 67 encircling the bottom of the container and connected by a branch pipe 68 through the casing of valve 65 and coupling 57 to the main conduit 53 to enter air under pressure to the top of the container to exert an extruding force on the material therein a branch pipe 69 is connected to the pipe 68 by a coupling interposed in the pipe 68, as at 70, the pipe 69 being extended through an opening in the extended side wall or body of the container and along the exterior of the side and top of the container and is connected to the top of the container adjacent the filler opening, as shown at 71 in Figures 1 and 2. The pressure of the air to the pipe 69 and the top of the container is reduced relative to the pressure of the air to the nozzles, and for this purpose a suitable reducing valve is interposed in said pipe 69, shown in a conventional manner at 72. To prevent the air exceeding a predetermined pressure in the container a suitable blow off or safety valve is provided adapted to be actuated by the air in the container when such air exceeds a predetermined pressure, and shown in a conventional manner at 73 interposed in the pipe 69 between the pressure reducing valve and the container. To indicate the pressure in the top of the container a suitable pressure gage 74 is connected to the pipe 69, which gage may be disposed relative to an opening in the closure 16 for observation from the exterior of the container.

The streams of the air pressure issuing from the nozzles 66 flow in an upward and diverging direction adjacent to the bottom wall of the container to effectively loosen any material adhering to the lower portion of the bottom wall, and the streams issuing from the nozzles 62 are directed about the bottom wall to effectively loosen any material adhering to the upper portion of the bottom wall and aerating the material in the bottom portion of the container.

In apparatus of this character in the handling of pulverized material, as the material is filled into and is transported in the container it flows into and packs in the nozzles and connecting pipes, and when the material consists of cement which may become set due to the absorption of moisture by the material, thus choking the nozzles and their connections with the source of air under pressure and preventing the delivery of such air from the nozzles. To prevent the entering and packing of material in the nozzles and connecting pipes, the nozzles are provided with valves contained within the nozzles and normally urged to position to close the nozzle orifice or orifices, and automatically actuated to position to open the nozzle orifices to the container by the air under pressure when the nozzles are connected with the source thereof. Each of the nozzles 62, 66 comprises a body or housing having a bore 75 of two diameters extended into one end of the body with the nozzle outlet in the opposite end of the body, the body being externally screw threaded, as at 76, whereby the nozzles are mounted in openings in the bottom wall of the container. The end of the body of the nozzles 66 (Figure 10) is exteriorly tapered with two diametrically opposite orifices 77 therein communicating with the bore of the body, these orifices being arranged in angular relation to each other so that the streams issuing therefrom flow in upward diverging directions along the bottom wall of the container and the diverging streams from one nozzle will intersect streams from adjacent nozzles. The outlet orifices of nozzles 62 (Figure 11) are arranged to extend diametrically opposite to direct the streams from said nozzles in opposite directions along the bottom wall of the container. The valve mechanism for the nozzles comprises a member of resilient material 78, such as rubber, having an arcuate or rounded face to engage a conical wall in said closed end of the body of the nozzles through which the discharge orifices open to provide a fluid tight seal. The portion of the valve opposite the rounded face is reduced in size and mounted in a recess in the end of a carrying stem or plunger 79. The opposite end portion of the plunger is reduced in diameter and slidably engages in an opening in a plug 80 threaded into and closing the open end of the body or housing 76. The plunger is arranged with a piston head within the body, consisting of a disk 81 of flexible material of greater diameter than the diameter of the portion of greater diameter 82 of the bore in and extending for approximately one-half the length of the body, the disk being held against movement on the plunger by a suitable metallic disk 83 having screw threaded connection with the plunger at one face of the flexible disk and a washer 84 impinged against the opposite face of the flexible disk 81 by a nut 85 screw threaded onto the plunger and clamping the flexible disk between the disk 83 and washer 84. The diameter of the disk 83 is less than the diameter of the portion 82 of the bore to permit lapping of the peripheral portion of the flexible disk 81 between the periphery of said disk and the wall of the bore and forming a fluid tight piston. The valve 78 is yieldingly urged to engage the conical seat or wall and normally close the outlet orifices 77 by a coiled spring 86 adjustably compressed between the plug 80 and the washer 84.

The bodies of the nozzles 62, 66 are connected to the pipes 63, 67 by angular pipes 87 screw threaded at one end into an opening in the wall of the nozzles intermediate the piston 81 and the discharge orifices, as shown in Figure 10, and said pipes 27 connected by couplings to nipples having screw threaded connection with openings in the pipes 63, 67, as shown at 87' in Figure 5. As the nozzles are connected to the source of air under pressure, the pressure of the air admitted into the nozzles exerts a force on the piston 81 to move the piston and connected valve in a direction to move the valve away from the discharge orifices against the tension of the spring 86 and permit of the discharge of the air through the discharge orifices. In the normal closing position of the valves 78 they will prevent the entrance of material from the container into the nozzles as during the filling of the material into the container and transporting of the container and a resultant clogging of the nozzles and supply pipes. A passage 88 is provided in the closure plug 80 for the admission of air to and escape of air from the chamber 82 between the piston 81 and the plug, a recess 89 also being arranged in the end of the closure plug in diametrically opposed relation to the passage 88 for the engagement of a spanner wrench in said recess and passage to facilitate the positioning of the closure plug in the bore of the body of the nozzles.

As stated the containers are adapted to be transported from a source of the material where the material is filled into the containers and the containers with the material filled therein transported to a place remote from the source of supply where the material is to be discharged from the containers to a place of storage or use in which case the containers are removably mounted by the means hereinbefore described upon the platform S of a flat railway car. It may be desired to transport the containers to a place remote from the railroad, and for this purpose the containers are provided with yoke members 90 fixed to the exterior of and spaced about the container body adjacent the head 13 for the engagement of hooks attached to a cable of a hoisting apparatus to transfer the containers to a motor vehicle to be transported thereby to the place where the material is to be discharged from the containers, or the material may be discharged by air under pressure admitted into the container on the car and delivered into a container on the motor vehicle. To assure properly positioning the containers on the platform of a railway car or truck relative to the cleats 25 and prevent rotative displacement of the containers relative to the supporting surface of the transporting vehicle pairs of lugs 91 are fixed to the exterior of the container, by welding or otherwise, the lugs being spaced apart a distance equal to the length and adapted to be positioned at the opposite ends of the cleats 25.

The containers are made of relatively thin material in order to reduce the weight thereof and facilitate handling and transporting of the containers, and therefore should the pressure of the fluid admitted into the container exceed a predetermined pressure there is a possibility of the container being ruptured. For this purpose the air admitted into the top of the container is at a lower pressure than the pressure of the air admitted into the lower portion of the container and the pressure gradually built up above the material in the container, the safety valve being arranged so that the pressure in the container will not exceed one-half the pressure of the air that is supplied to and discharged from the nozzles into the container; for instance, the pressure of the air discharged from the nozzles may be from fifty to sixty pounds per square inch, and the safety valve is provided and adapted to be actuated by the pressure of the air in the container to release the air from the container when the pressure thereof exceeds thirty pounds per square inch.

The construction of the nozzle or jet 58 is the same as that of the nozzles 62 and 66 except that it is provided with a single discharge orifice centrally through the end of the body of the nozzle.

The method of discharging the material from the container is substantially as follows: The closure 49, 52 is removed from the outlet means 47, 61 and a conduit through which the material discharged from the container is to be conveyed is connected to said outlet means. The cap 55 is removed from the pipe 53 and said pipe connected with a valve controlled conduit leading from the source of air under pressure. The valve 65 is normally actuated to position to shut off the pipe 53 from the pipes 64 and 68, the pipe 56 connected with the nozzle 58 being at all times open to the pipe 53. In this condition of the parts the source of air pressure is opened to the pipe 53 and nozzle 58, the flow of the fluid pressure from said nozzle causing the breaking down and clearing of any material from the outlet of the container. The valve 65 is then actuated by a lever 92 connected to the valve and extended through a slot 93 in the closure 16 to connect the pipe 68 and thereby the nozzles 66 and the pipe 69 for admitting air under pressure into the top of the container above the material therein and from the nozzles in upward diverging directions along the bottom wall of the container. The air under pressure discharged from the nozzles 58, 66 being at a higher pressure or greater velocity than the air pressure admitted into the top of the container there is a loosening and aerating of the material in the bottom portion of the container by the air pressure discharged from the nozzles 66 and the air pressure delivered from the nozzle 58 being directed toward the outlet means there is induced a reduction in the pressure at the outlet and a consequent drawing of the aerated material from the container and the discharge thereof with the air issuing from the nozzle 58 into the outlet means and conveyed thereby through the outlet means and the connected conveying conduit to the place of use or storage. As the material from the bottom portion of the container is discharged the pressure is built up in the container above the material therein and acts to move the material in the container toward the outlet. In practice it has been found that by maintaining such connections with the source of air pressure for a period of approximately ten minutes the bulk of the material is discharged from the container. However, should the material in the container consist of pulverized material, particularly cement, due to the absorbing of moisture by the material part of the material will adhere to the bottom wall of the container and the juncture of the bottom wall with the body of the container. To clear this material from the container wall and effect a complete discharge of the material from the container the valve 65 is actuated to shut off the nozzles 66 and the pipe 69 and to connect the pipe 64 and thereby the nozzles 62 with the inlet pipe 53. After maintaining such connection with the source of air pressure for a short interval of time the nozzles 62 are shut off from the inlet pipe 53 and the nozzles 66 and the pipe 69 are again connected with the source of air pressure for a short interval of time to effect a complete discharge of the loosened material from the container, and thereafter the source of air pressure is shut off from the inlet pipe 53, the operation of discharging the material from the container having been completed.

By arranging the container with the hopper bottom and extending the side wall or the body below the bottom to serve as the supporting and mounting means for the container upon the platform of a transporting vehicle there is provided a chamber or housing in which the operative parts, such as valves and gages, of the apparatus are enclosed, thus preventing the surreptitious removal of the same during transit. Furthermore, the closure 16 for the access opening in said extended side wall of the container may be provided with a suitable seal, such as a railway freight car door seal, to indicate whether or not the closure 16 has been removed and a possible tampering with the parts. Also by the arrangement of extending the conduit of the outlet means and the inlet pipe through openings in the closure 16 to the exterior of the container the connecting of the container with the source of air under pressure and with a conduit through which to convey the material discharged from the container is greatly facilitated.

Having described my invention, I claim:

1. In means for handling and transporting pulverulent, granular and the like material, a pressure container comprising a vertically disposed cylindrical body having a filling inlet at the top and a hopper bottom having an outlet with the body extending beyond and surrounding the hopper bottom to constitute a supporting base for the container and forming a compartment enclosing the hopper bottom, and said base provided with an access opening communicating with the compartment, a removable closure for the access opening, an air supply pipe extended through an opening in said closure into the compartment with the inlet exterior of the compartment and arranged for coupling connection of a conduit leading from a source of air under pressure or a closure to seal the inlet, means having a valve controlled connection with said supply pipe within the compartment and connected in communication with the container through the hopper bottom and top thereof to admit air under pressure into the container to aerate and discharge material thereby from the container, and a discharge conduit connected to the hopper outlet within the compartment extended laterally through an opening in the closure for the access opening with the outlet of the conduit exterior of the compartment and arranged for connection thereto of a closure or a conveying conduit for the material discharged from the hopper outlet.

2. Means for handling and transporting pulverulent, granular and the like material as claimed in claim 1, wherein the closure for the outlet of the discharge conduit includes a plug member adapted to be engaged in and of a length to extend adjacent to the connection of the discharge conduit to the hopper outlet.

3. In means for handling and transporting pulverulent, granular and the like material, a pressure container comprising a vertically disposed cylindrical body having a filling inlet at the top and a hopper bottom having an outlet, said hopper bottom being arranged within the body and the body extending beyond and surrounding the hopper bottom to constitute a supporting base for the container and forming a compartment enclosing the hopper bottom, and said base provided with an access opening communicating with the compartment, a closure for said access opening removably secured to the container body, a discharge conduit connected to the hopper bottom in communication with the hopper outlet and extended laterally through an opening in the closure for the access opening with the outlet exterior of the compartment, an air supply pipe extended through an opening in the closure for the access opening into the compartment with the inlet exterior of the compartment, nozzles mounted on and discharging through the hopper bottom into the container, branch pipes connected to the supply pipe within the compartment leading to and connected to the nozzles, and one of said branch pipes extending along the exterior of the container and connected in communication with the top of the container, a valve to control the connections of the branch pipes with the air supply pipe within the compartment and the admitting of air into the container and discharge of material therefrom, and a lever adapted to be connected to said valve within the compartment and extended through a slot in the closure for the access opening to actuate the valve from the exterior of the compartment.

4. In an apparatus for shipping flour or other pulverulent, granular or similar materials, a shipping container comprising a vertically disposed cylindrical pressure vessel having a hopper outlet at its bottom and a filling inlet at its top, means for sealing said inlet and outlet, the container having a base portion surrounding its hopper bottom and forming a compartment enclosing the same, said base portion of the container being provided with an access opening communicating with said compartment, an air supply conductor having a connection for coupling it to an air supply pipe and provided with branches, one extending to and in communication with the top of the container and the other extending to and communicating with the hopper bottom thereof, and a valve in said pipe in proximity to said access opening.

5. In an apparatus for shipping pulverulent, granular and similar materials, a pressure container comprising a vertically disposed cylindrical body having a filling inlet at its top and provided with a hopper bottom formed with a discharge outlet, the container body being also provided with a base portion surrounding the hopper bottom and forming a compartment enclosing the same, said base portion being provided with an access opening communicating with the compartment, an air pressure supply conductor on the container having an inlet for coupling connection with the source of air pressure supply and a pair of branch pipes, one leading to and communicating with the top of the container and the other extending to and communicating with the hopper bottom, and a control valve arranged in the first-named branch pipe adjacent to said access opening.

JOSEPH E. KENNEDY.